(12) United States Patent
Melvin et al.

(10) Patent No.: US 6,984,168 B1
(45) Date of Patent: Jan. 10, 2006

(54) APPARATUS AND METHOD FOR CHEMICAL MECHANICAL POLISHING OF SUBSTRATES

(75) Inventors: Jason Melvin, Cambridge, MA (US); Nam P. Suh, Sudbury, MA (US); Hilario L. Oh, Rochester Hills, MI (US)

(73) Assignees: Aviza Technology, Inc., Scotts Valley, CA (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/628,563

(22) Filed: Jul. 31, 2000

(30) Foreign Application Priority Data

Jul. 28, 1999 (JP) .............................. 11-213783

(51) Int. Cl.
*B24B 29/00* (2006.01)
*B24B 5/00* (2006.01)
(52) U.S. Cl. .................. 451/285; 451/287; 451/288; 451/390; 451/398
(58) Field of Classification Search .............. 451/41, 451/285–289, 390, 398
See application file for complete search history.

(56) References Cited

U.S. PATENT DOCUMENTS

| | | | |
|---|---|---|---|
| 5,486,129 A | 1/1996 | Sandhu et al. ............. 451/5 |
| 5,605,488 A | 2/1997 | Ohashi et al. ............. 451/7 |
| 5,716,258 A * | 2/1998 | Metcalf ..................... 451/41 |
| 5,851,140 A * | 12/1998 | Barns et al. .............. 451/288 |
| 5,916,015 A * | 6/1999 | Natalicio ................... 451/288 |
| 5,916,016 A | 6/1999 | Bothra ...................... 451/288 |
| 5,964,653 A | 10/1999 | Perlov et al. ............. 451/288 |
| 5,980,367 A * | 11/1999 | Metcalf ..................... 451/285 |
| 5,993,302 A * | 11/1999 | Chen et al. ............... 451/285 |
| 6,024,630 A * | 2/2000 | Shendon et al. .......... 451/41 |
| 6,036,587 A | 3/2000 | Tolles et al. .............. 451/288 |
| 6,056,632 A | 5/2000 | Mitchel et al. ........... 451/288 |
| 6,062,133 A | 5/2000 | Blalock ..................... 100/211 |
| 6,068,549 A | 5/2000 | Jackson .................... 451/398 |
| 6,290,577 B1 * | 9/2001 | Shendon et al. .......... 451/41 |
| 2002/0115397 A1 * | 8/2002 | Kajiwara et al. ......... 451/398 |

FOREIGN PATENT DOCUMENTS

WO    WO99/02304    1/1999

OTHER PUBLICATIONS

Adams, et al., "Process Control and Endpoint Detection with Fullscan ISRM System in Chemical Mechanical Polishing of Cu Layers," CMP-MIC, Mar. 2000, 5 pages.

(Continued)

*Primary Examiner*—M. Rachuba
(74) *Attorney, Agent, or Firm*—Dorsey & Whitney LLP

(57) ABSTRACT

A chemical mechanical polishing system having a wafer carrier assembly is provided. The wafer carrier assembly includes a wafer carrier support frame, a wafer carrier head housing rotable mounted on the wafer carrier support frame, with a base including a bladder bellows operating connecting the wafer carrier base to the wafer carrier head housing such that rotational torque is transferred from the wafer carrier head housing to the wafer carrier base. Further provided is a retaining ring, operatively connected to a retaining ring bearing which allows relative axial motion while constraining relative radial motion between the retaining ring and the wafer carrier head housing; and a retaining ring bellows, operatively connecting the retaining ring bearing to urge the retaining ring against a polishing member. A chamber formed by the bladder bellows, the wafer carrier base and the wafer carrier head housing may be pressurized to load the wafer carrier base against a polishing member, independent of any frictional loads on the retaining ring.

9 Claims, 10 Drawing Sheets

OTHER PUBLICATIONS

Bonner et al., *"Removal Rate, Uniformity and Defectivity Studies of Chemical Mechanical Polishing of BPSG Films,"* MRS, Spring 2000, 6 pages.

Garretson et al., *"New Pad Conditioning Disk Design Delivers Excellent Process Performance While Increasing CMP Productivity,"* CMP Technology for ULSI Interconnection, SEMICON West 2000, 9 pages.

Osterheld et al., *"A Novel Retaining Ring in Advanced Polishing Head Design for Significantly Improved CMP Performance,"* MRS, Apr. 5-9, 1999, 8 pages.

Römer et al., *"STI CMP Using Fixed Abrasive Demands, Measurement Methods and Results,"* CMP-MIC, Mar. 2000, 10 pages.

Surana et al., "Defectivity Reduction in Copper CMP Processes," VMIC, Jun. 2000, 3 pages.

Tang, et al., *"Novel Integrated Single Wafer Immersion Megasonics for Advanced Post CMP Cleaning in a Next Generation Dry-in Dry-out CMP System,"* CMP-MIC, Mar. 2000, 5 pages.

\* cited by examiner

APPARATUS AND METHOD FOR CHEMICAL MECHANICAL POLISHING OF SUBSTRATES

BRIEF DESCRIPTION OF THE INVENTION

This invention relates to a new and improved apparatus and method for chemical mechanical polishing of thin discs, and more particularly, to a substrate or wafer carrier for a chemical mechanical polishing machine.

RELATED APPLICATIONS

This patent application is related to co-pending patent application Ser. Nos. 09/628,874 and 09/629,962 both filed simultaneously herewith, and both incorporated by reference in their entirety.

BACKGROUND OF THE INVENTION

Manufacture of semiconductors has become increasingly complex as the device densities increase. Such high density circuits typically require closely spaced metal interconnect lines and multiple layers of insulating material, such as oxides, formed atop and between the interconnect lines. Surface planarity of the semiconductor wafer or substrate degrades as the layers are deposited. Generally, the surface of a layer will have a topography that conforms to the sublayer, and as the number of layers increase the non-planarity of the surface becomes more pronounced.

To address the problem, chemical mechanical polishing (CMP) processes are employed. The CMP process removes material from the surface of the wafer to provide a substantially planar surface. More recently, the CMP process is also used to fabricate the interconnecting lines. For example, when depositing copper leads or interconnect lines, a full layer of the metal is deposited on the surface of the wafer having grooves formed in an oxide layer. The metal layer may be deposited by sputtering or vapor deposition or by any other suitable conventional technique. The oxide layer, such as doped or undoped silicon dioxide, is usually formed by chemical vapor deposition (CVD). The metal layer covers the entire surface of the wafer and extends into the grooves. Thereafter, individual leads 16 are defined by removing the metal layer from the surface of the oxide. The CMP process may be used to remove the surface metal leaving the leads in the grooves. The leads are insulated from one another by the intervening oxide layer.

In general, to carry out the CMP process, a chemical mechanical polishing (CMP) machines is used. Many types of CMP machines are used in the semiconductor industry. CMP machines typically employ a rotating polishing platen having a polishing pad thereon, and a smaller diameter rotating wafer carrier which carries the wafer whose surface is to be planarized and/or polished. The surface of the rotating wafer is held or urged against the rotating polishing pad. A slurry is fed to the surface of the polishing pad during polishing of the wafer.

One example of such prior art systems is described in U.S. Pat. No. 5,964,653. The carrier head disclosed by the '653 patent includes a base and a flexible member connected to the base to define first, second, and third chambers. Pressures within the chambers are independently controllable such that biasing force of corresponding portions of the flexible member against the wafer are independently controllable. The carrier head of the '653 patent also includes a flange attachable to a drive shaft and a gimbal pivotally connecting the flange to the base. The gimbal includes an inner race connected to the base, an outer race connected to the flange to define a gap there between, and a plurality of bearings located in the gap.

Because a gimbal is used to align the wafer carrier with the polishing pad in known CMP systems, the frictional loads on the wafer cannot be isolated from the pressure distribution against the wafer during polishing. In particular, the multiple degrees of freedom provided by the gimbal may disadvantageously convert frictional loads, which generally extend parallel to the surface of the wafer, to normal forces extending perpendicular to the surface of the wafer thereby directly affecting the pressure of the wafer against the polishing pad. The coupling of these frictional forces to the wafer effect the pressure distribution across the wafer which is turn adversely effects the uniformity of removal of the material from the surface of the wafer. Accordingly, an improved CMP apparatus and method are needed.

OBJECTS AND SUMMARY OF THE INVENTION

Accordingly, it is an object of the present invention to provide an improved chemical mechanical polishing (CMP) apparatus and method.

More specifically, in one aspect of the present invention, CMP apparatus and method is provided including a wafer carrier capable of retaining a wafer such that the pressure distribution of the wafer against a polishing pad is independent of the frictional loads imposed on the wafer during a polishing procedure.

In another aspect of the present invention there is provided a chemical mechanical polishing apparatus including a wafer carrier having a wafer pressure system for biasing the wafer against a polishing pad, and a retaining ring for wafer retention, in which the pressure of the retaining ring against the polishing pad is controlled independently of the wafer pressure system biasing the wafer.

In yet another aspect of the present invention the wafer carrier includes a flexible membrane having a plurality of chambers formed therein which each independently urge against the wafer at corresponding localized zones or regions on the wafer, to selectively control the amount of pressure applied to the chambers and therefore control the extent of the material removal rate at the corresponding localized zone on the wafer during the CMP process.

The foregoing and other objects of the invention are achieved by a chemical mechanical polishing system employing a wafer carrier assembly having a wafer carrier support frame, a wafer carrier head housing rotatably mounted on said wafer carrier support frame, with a base including a bellows operably connecting the base to the wafer carrier housing such that rotational torque is transferred from said wafer carrier head housing to said wafer carrier base independently of frictional loads transmitted from said wafer carrier base to said wafer carrier head housing during a chemical mechanical polishing operation.

More specifically, the wafer carrier assembly includes a wafer carrier support frame, a wafer carrier head housing rotable mounted on the wafer carrier support frame, with a base including a bladder bellows operating connecting the wafer carrier base to the wafer carrier head housing such that rotational torque is transferred from the wafer carrier head housing to the wafer carrier base. Further provided is a retaining ring, operatively connected to a retaining ring bearing which allows relative axial motion while constraining relative radial motion between the retaining ring and the wafer carrier head housing; and a retaining ring bellows, operatively connecting the retaining ring bearing to urge the retaining ring against a polishing member. A chamber formed by the bladder bellows, the wafer carrier base and the wafer carrier head housing may be pressurized to load the wafer carrier base against a polishing member, independent of any frictional loads on the retaining ring.

In an additional embodiment the wafer carrier further includes: a flexible membrane is connected to the base and defines a plurality of chambers therein, a lower surface of the flexible membrane providing a wafer receiving surface with a plurality of inner portions associated with respective ones of said plurality of chambers to define corresponding localized regions or zones on the surface of the wafer, and wherein the pressures within each of said chambers are independently controllable.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
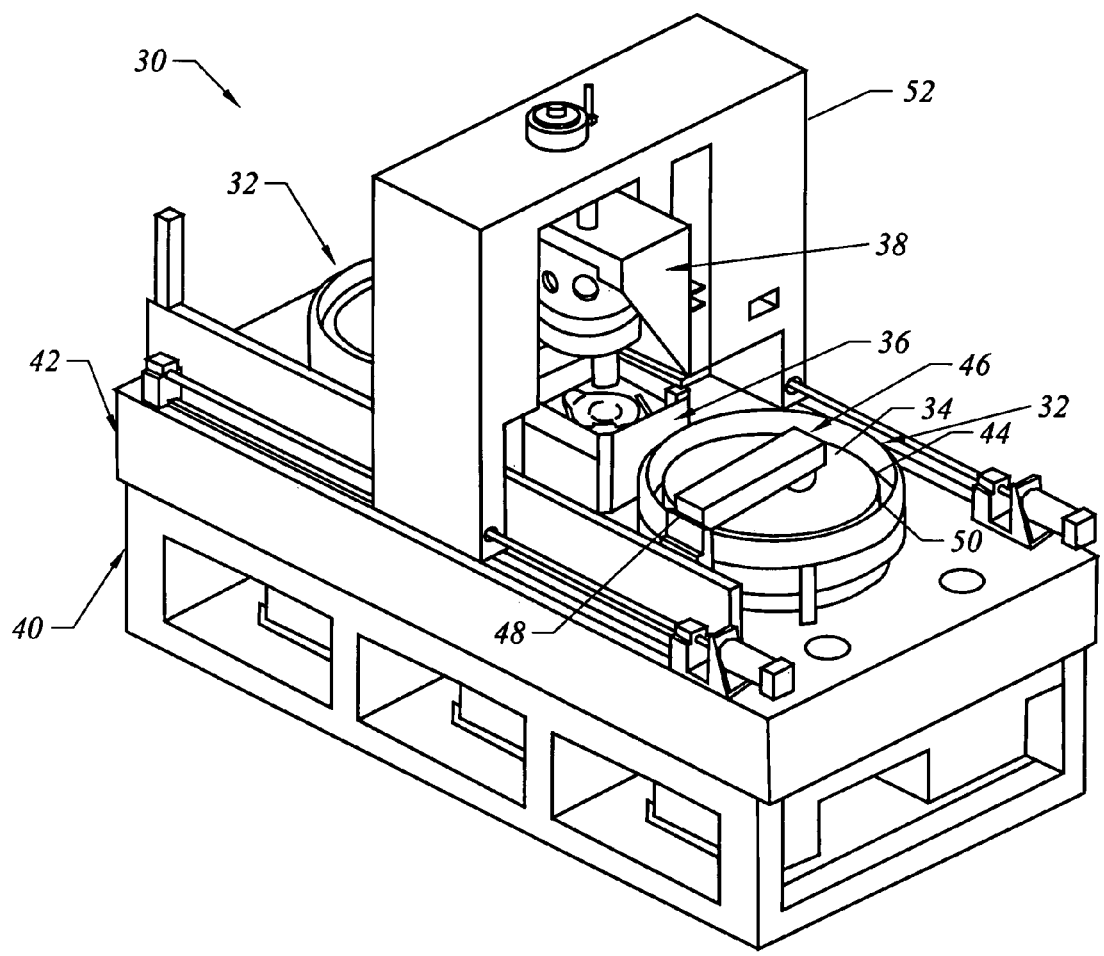
FIG. 1 is a perspective view of a chemical mechanical polishing apparatus in accordance with the present invention.

An improved chemical mechanical polishing (CMP) system is provided. More specifically, of significant advantage the inventors have developed a CMP apparatus and method which includes a wafer carrier capable of retaining a wafer such that the pressure distribution of the wafer against a polishing pad is independent of the frictional loads imposed on the wafer during a polishing procedure. Moreover, in another embodiment the CMP apparatus and method includes a wafer carrier having a wafer pressure system for biasing the wafer against a polishing pad, and a retaining ring for wafer retention, in which the pressure of the retaining ring against the polishing pad is controlled independently of the wafer pressure system biasing the wafer. Additionally, in another embodiment of the present invention the wafer carrier includes a flexible membrane having a plurality of chambers formed therein which each independently urge against the wafer to define corresponding localized zones or regions on the wafer surface. These chambers are independently pressurized to selectively control the amount of pressure applied to the chambers and therefore control the extent of the material removal rate at the corresponding localized zone on the wafer surface during the CMP process.

Thus, of significant advantage, the present invention provides a wafer carrier which embodies desired design parameters for wafer retention and pressure application. One of the necessary functions for wafer retention is to support the frictional loads for polishing. According to the present invention these loads are transferred to the spindle bearings without the use of a gimbal structure, as is seen in the prior art. In prior art system, a gimbal is typically used to align the wafer carrier with the pad. As described above, with the gimbal arrangement, the frictional loads on the wafer are not isolated from the pressure distributed to the wafer during polishing, thus resulting in uniformity problems. In contrast, the present invention isolates the frictional forces from the pressure distributed to the wafer, and employs machine precision to align the retaining ring and the pad, and allows compliance behind the wafer by using a flexible membrane which aligns the wafer with the polishing pad surface.

In addition to independence of the pressure distribution from the frictional loads on the wafer, the present invention also provides independence of the retaining ring from the wafer pressure system which allows the independent control of the retaining rings pressure or position, as desired, from the nominal polishing pressure. This feature allows one to improve the uniformity of the CMP process by controlling the edge effects caused by the pad.

Reference will now be made in detail to the specific embodiments of the invention, examples of which are illustrated in the accompanying drawings. While the invention will be described in conjunction with the specific and preferred embodiments, it will be understood that they are not intended to limit the invention to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIG. 1, which shows a chemical mechanical polishing apparatus 30 in accordance with the present invention including a plurality of polishing stations 32 supporting an abrasive polishing pad 34, a combination loading and cleaning station 36, and a wafer carrier assembly 38.

The chemical mechanical polishing (CMP) apparatus 30 is provided to process one or more substrates and is particularly suited to polish the surfaces of silicon wafers "W" to remove excess and undesirable material. Various processing parameters must be accurately controlled and monitored to maximize wafer processing throughput, that is chemical mechanical polishing throughput. For example, slurry flow distribution to the platens, pressure distribution of the wafer against the platens, the relative velocity of the wafer and the polishing pad and the condition of the polishing pad are important factors in determining the throughput of a CMP apparatus.

The CMP apparatus 30 includes a machine base 40 with a table top 42 mounted thereon. The table top 42 supports the series of polishing stations 32 and the combination loading and cleaning station 36. The polishing stations 32 and the loading/cleaning station 36 are linearly aligned. The loading/cleaning station 36 serves multiple functions including receiving individual wafers from a loading apparatus (not shown), washing the wafers, loading the wafers into the wafer carrier assembly 38, receiving the wafers from the wafer carrier assembly 38, washing the wafers again, and finally transferring the wafers back to the loading/cleaning station 36.

Each polishing station 32 includes a rotatable platen 44 and an abrasive polishing pad 34 releasably secured thereon. The platen 44 is preferably dimensioned such that its diameter is approximately 1½ to three times larger than the diameter of the wafers to be polished. The platen 44 may be a rotatable aluminum or stainless steel plate rotatably driven by suitable means (not shown). Preferably the platen drive means, and other components that are susceptible to generating contaminating particles, are located below the platen 44 and thus below the polishing pad 34. For most polishing processes, the platen 44 rotates at approximately 50–500 revolutions per minute, however other speeds may be used.

The polishing pad 34 is preferably formed of a compliant, and often porous, material with a compliant polishing surface. The polishing pad is attached to the platen 44 by a pressure-sensitive adhesive layer. The polishing pad 34 may have a hard upper layer and a softer lower layer. The upper layer may be a polyurethane mixed with fillers. The lower layer may be composed of compressed felt fibers leached with urethane.

Each pad surface may be abraded by a pad conditioner 46 having a conditioner head 50 disposed on an arm 48 that may be positioned at any specific radius on the pad, and loaded against the pad while relative motion is created. The pad conditioner 46 maintains the condition of the polishing pad 34 so that it will effectively transport slurry to the polishing interface of the pad and wafer. The pad conditioner may include a washing station to remove slurry and wear materials.

A slurry containing abrasive particles such as silicon dioxide in a transport fluid, and possibly a chemically-reactive catalyzer such as potassium hydroxide, is supplied to the surface of the polishing pad 34 by a slurry supply port in the center of the platen 44 or a dispenser tube above the pad (not shown). Alternatively, the slurry can be delivered to the surface of the pad through the wafer carrier. A sufficient amount of slurry is provided to maintain a maximum removal rate of material from the surface of the wafer during polishing.

A wafer carrier support frame 52 is positioned above the machine base. The wafer carrier support frame 52 is supported for linear movement along the table top 42 along an x-axis along a suitable track 54. The wafer carrier support frame 52 supports the wafer carrier 38 for movement within an xz-plane. The wafer carrier 38 receives and holds wafers, and presses them against the polishing pad 34 on the platen 44 of each respective polishing station 32 for polishing the wafers. The wafer carrier support frame 52 and wafer carrier 38 preferably include sealed cover plates and enclosures to minimize contamination of the wafers by particles generated by the components thereof.

During actual polishing, the wafer carrier 38 is positioned at and above a platen 44 of a polishing station 32. An actuator housed within the support frame 52 lowers the wafer carrier 38 and the wafer attached thereto with respect to the wafer carrier support frame 52 and into contact with the polishing pad 34. The wafer carrier 38 urges the wafer against the polishing pad 34.

Figure 2:
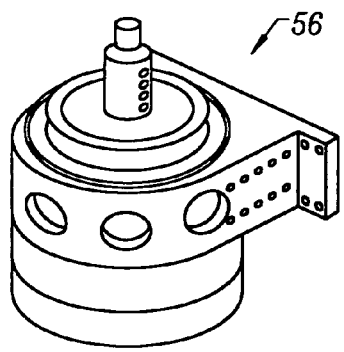
FIG. 2 is an enlarged perspective view of a wafer carrier assembly shown in FIG. 1.
Figure 3:
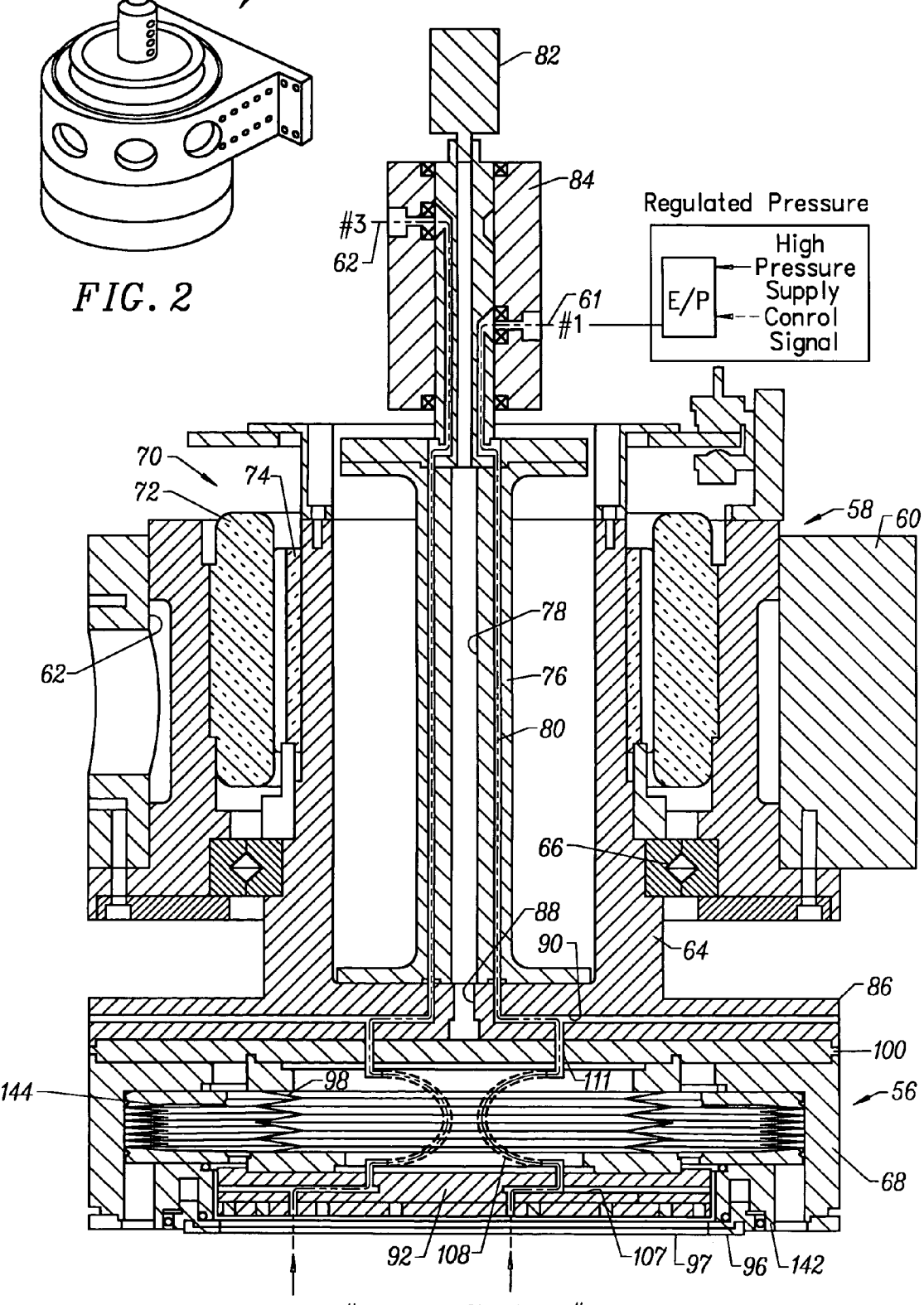
FIG. 3 is a sectional view of the wafer carrier assembly shown in FIG. 2 taken along line 3—3, and showing the fluid connection system.
Figure 4:
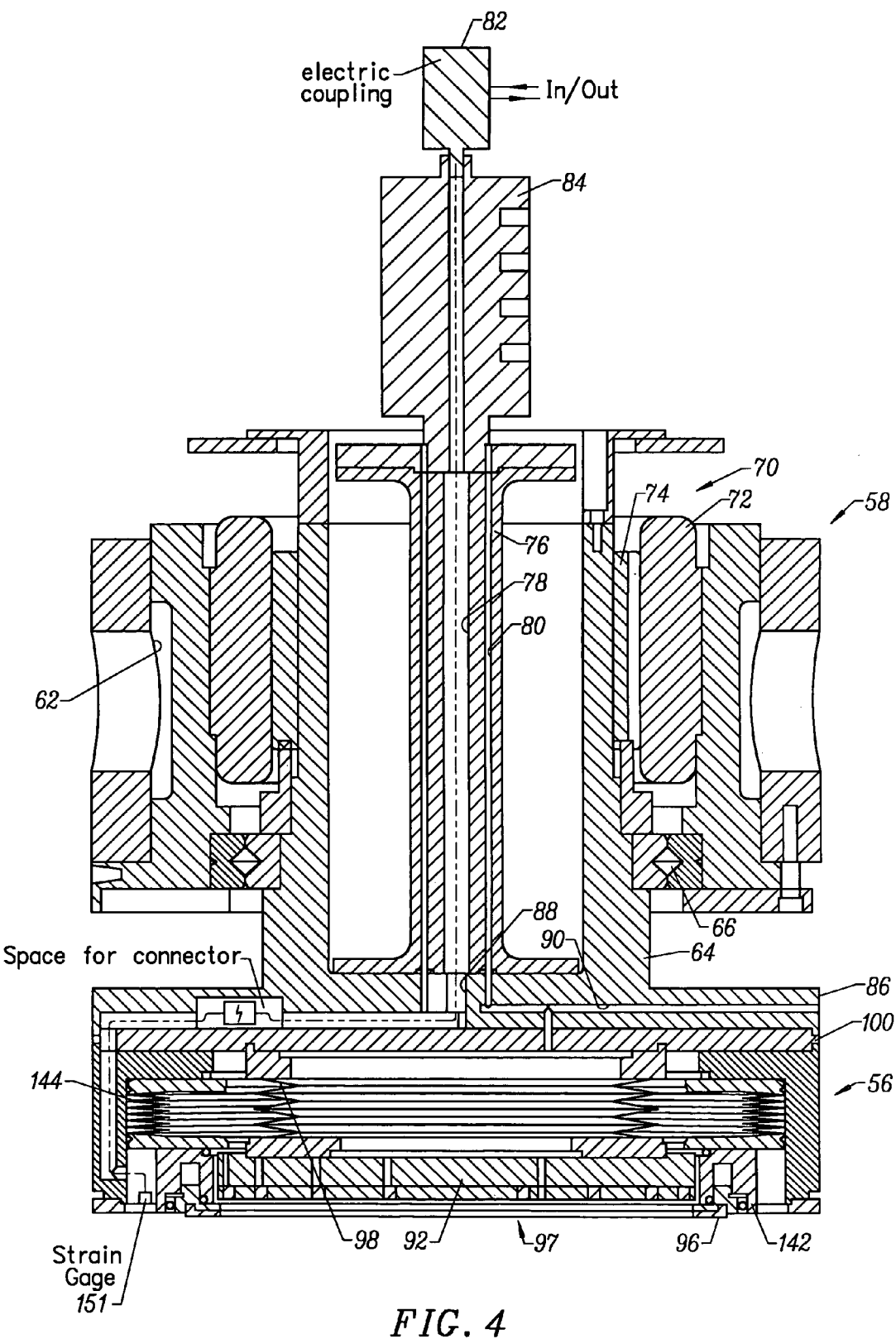
FIG. 4 is a different sectional view of the wafer carrier assembly shown in FIG. 2 showing the electrical connection system.

Referring to FIGS. 2, 3 and 4, the wafer carrier 38 generally includes a wafer carrier head 56, the support frame 52 having actuators (not shown) for moving the wafer carrier 38 within the xz-plane, and a drive assembly 58. The drive assembly 58 includes a mounting bracket 60 rigidly mounted on the support frame (not shown in FIG. 3 or 4. The mounting bracket 60 has a through-bore 62 having an axis which extends approximately vertically above the table top 42. The drive assembly 58 also includes a cylindrical head shaft 64 concentrically and rotatably connected to the mounting flange 60 by a suitable bearing assembly 66. The head shaft 64 rigidly supports a wafer carrier head body 68. An electric motor 70 rotates the wafer carrier head 56 relative to the wafer carrier frame 52. Preferably, a large diameter carrier motor 76 is used to provide clearance for the through-bore 62 which contains fluid and electrical conduits. The carrier motor 70 includes an electric motor stator 72 mounted on the mounting flange 60 and an electric motor rotor 72 mounted on the head shaft 64. Preferably, the motor 70 is a brushless DC motor in order to minimize generation of contamination particles. The components of the motor may be enclosed by a housing or protected by a cover to protect them from inadvertent slurry splash or other contaminants during operation of the chemical mechanical polishing apparatus/process.

To load the wafer against the surface of the polishing pad 34, wafer carrier 38 and wafer carrier head 56 are moved in the z-direction until the wafer is pressed against the polishing pad 34. The wafer carrier 38 is raised so that the wafer carrier head 56 and the wafer may be lifted away from the polishing pad during the transfer of the wafer between the polishing stations 32 and the loading/cleaning station 36.

Preferably the CMP apparatus applies a force of approximately two to ten pounds per square inch (psi) to the wafer and the pressure may be varied during polishing. The electric motor 70 rotates the wafer carrier head 56 at about 300–500 revolutions per minute, although other speeds may be selected as appropriate. As noted above, the platen 44 rotates at about 300–500 revolutions per minute. It is preferred that the rotation speeds of the wafer carrier head and the platen are substantially equal, but not perfectly synchronized so as to average pad non-uniformities. Other speeds may be used depending on the application.

FIGS. 3 and 4 are different section views illustrating the fluid system and the electrical system, respectively. Referring to FIGS. 3 and 4, a tubular conduit 76 extends concentrically within the head shaft 64. The tubular conduit 76 extends substantially the length of the head shaft 64. The conduit 76 includes a plurality of passageways 78, 80 for electrical and fluid lines. Both an electrical rotary coupling or a rotary electrical-pass-through 82 and a fluid rotary coupling or rotary fluid-pass-through 84 are operably mounted at the top of the conduit 76. Accordingly, an electrical circuit and a fluid circuit operably extend from the non-rotating wafer carrier support frame 52, through a respective rotary coupling 82, 84, through the rotatable head shaft 64, and to the rotatable wafer carrier head 56. Specifically, an electrical circuit passageway as well as a plurality of fluid passageways extend through the conduit 76 and allow an electrical supply and a plurality of pumps and/or valves to be operably connected to the wafer carrier head 56.

In the illustrated embodiment of FIG. 4, an electric passageway 78 is provided for the electric coupling of the electric motor and for any electrical sensors which may be provided on the wafer carrier head 56. Six fluid passageways (two of which are shown in FIG. 3 as 61 and 63) are also provided to fluidly connect six independently controlled fluid sources to respective fluid pressure chambers formed in the wafer carrier head 56 and the bladder and retaining ring bellows as discussed below. This configuration allows the wafer carrier head 56 to exert varying pressures at localized regions or zones of the wafer surface against the polishing pad 34 as is discussed in greater detail below. The fluid passageways are also used to pneumatically power the wafer carrier head 56 in a manner to vacuum chuck the wafer to the bottom of the wafer carrier head 56.

Referring to FIGS. 3 and 4, the head shaft 64 includes a head shaft flange 86 which extends radially from the bottom of the head shaft 64. The head shaft flange 86 is a generally disc-shaped body and includes passages 88, 90 which correspond to the electric and fluid passageways 78, 80 in the conduit 76.

Figure 5:
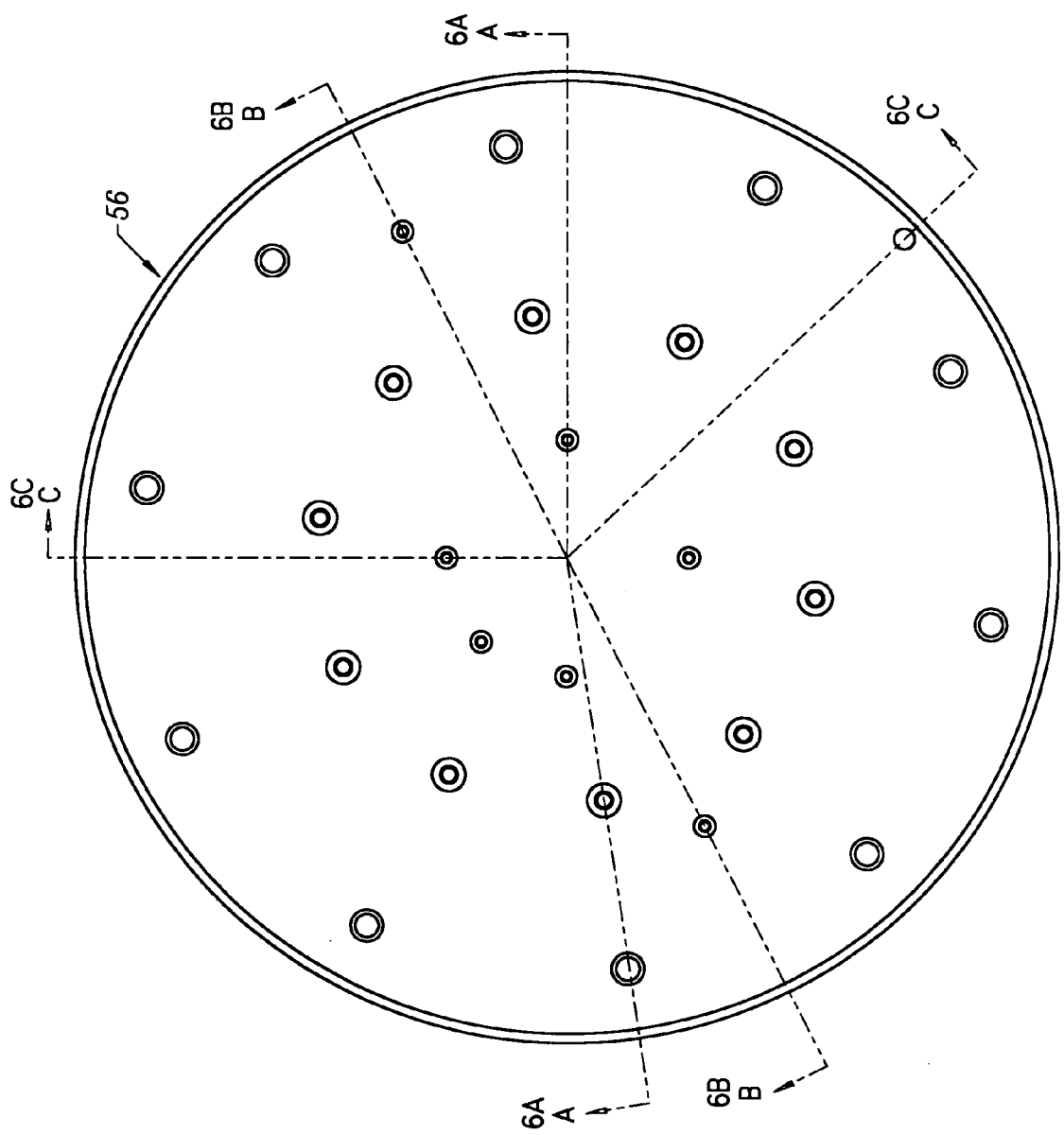
FIG. 5 is a top view of the wafer carrier head of the present invention.

Of particular advantage, the wafer carrier head 56 provides for pressure distribution to the wafer without influence by the frictional loads in the machine. Specifically referring to FIG. 5 is a top view of the wafer carrier 56, showing sections A—A, B—B and C—C that correspond to FIGS. 6A, 6B and 6C, respectively. Referring to FIGS. 6A–6C, FIGS. 9A–9B and FIGS. 10A–10B, the wafer carrier head 56 generally includes the carrier head housing 68, a carrier head base 92, a flexible membrane 94 mounted on a backing plate on the carrier head base 92 to form a closed bladder 95 having chambers formed therein (also referred to as a compartmentalized membrane), and a retaining ring 96. The wafer carrier 38 of the present invention utilizes a bladder bellows 98 to connect the bladder 95 to the carrier head body 68 in such a manner that the carrier head base 92 can accommodate misalignment between the wafer and the polishing pad 34.

The wafer carrier body 68 is connected to the head shaft flange 86 by a wafer carrier top plate 100. The carrier head base 92 is operably connected to the carrier body 68 by the bladder bellows 98. The bladder bellows 98 operably connects and transmits torque to the carrier base 92 and the carrier head body 68 to rotate the head about an axis of rotation which is substantially perpendicular to the surface of the polishing pad 34. The bladder bellows 98 have a cavity that is pressurized, and that pressure is defined as the bias pressure, which balances the force the flexible membrane exerts on the wafer. This bias pressure may be varied in order to control the force exerted on the membrane. The bladder bellows 98 may be formed of any suitable material which allows for the transmit of torque, provides compliance in the z-direction, and has a pressure capacity in the range of about 0–40 psia. The bladder bellows 98 is preferably formed of metal however it can also be formed of a compliant material such as silicone or an elastomer.

Figure 6A:
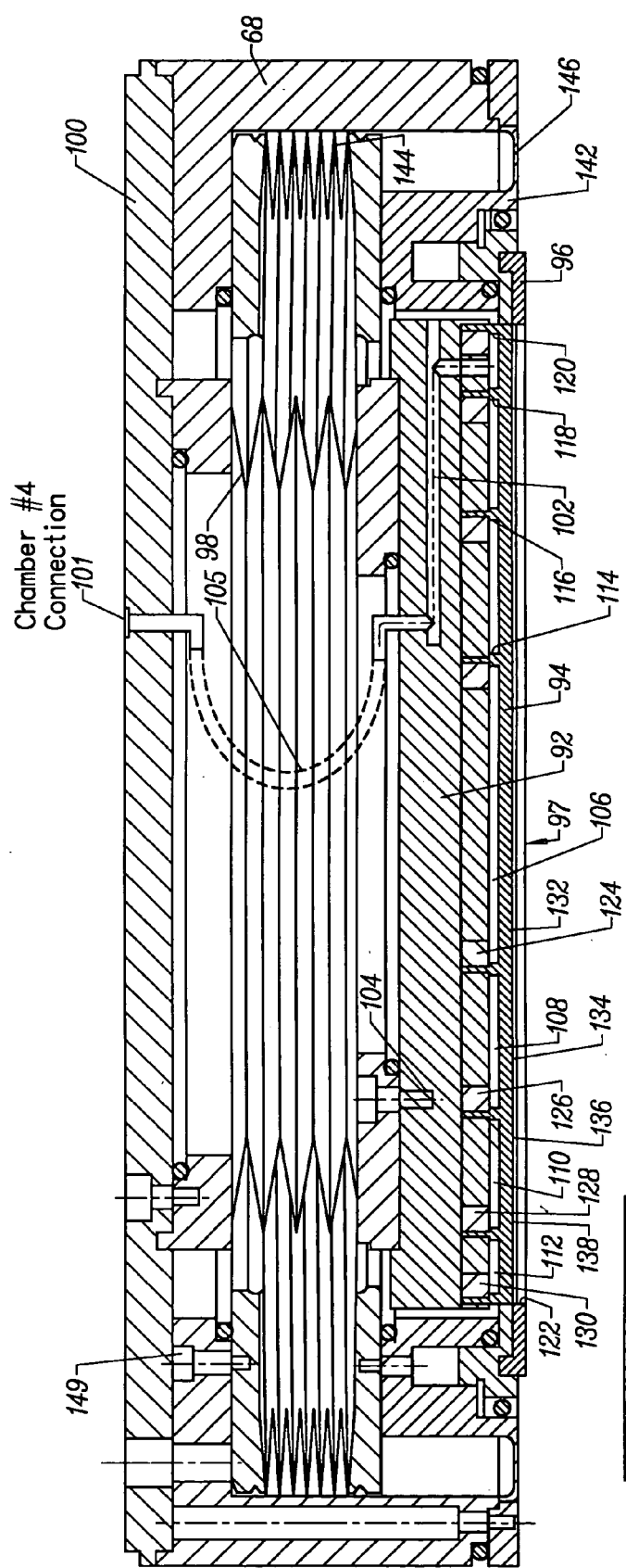
FIGS. 6A, 6B and 6C are section views of the wafer carrier head shown in FIG. 5 taken along lines A—A, B—B and C—C, respectively.
Figure 6B:
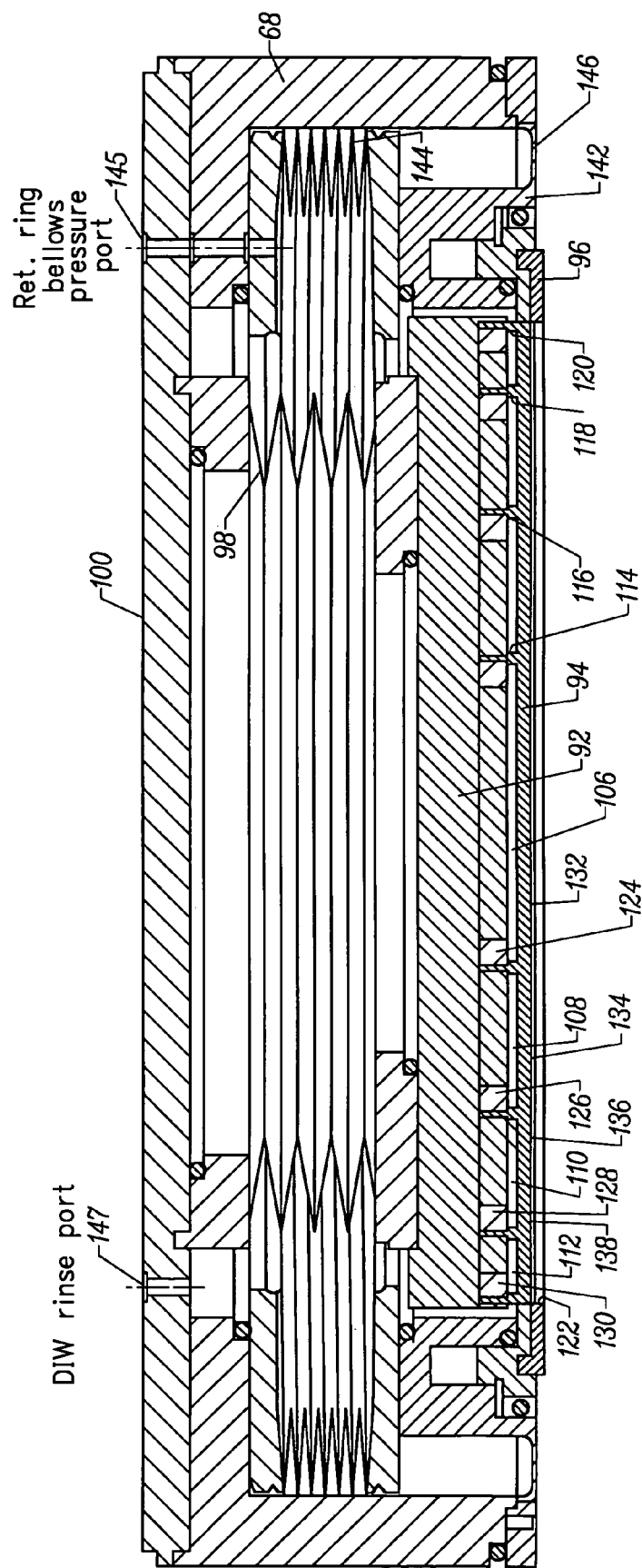
Figure 6C:
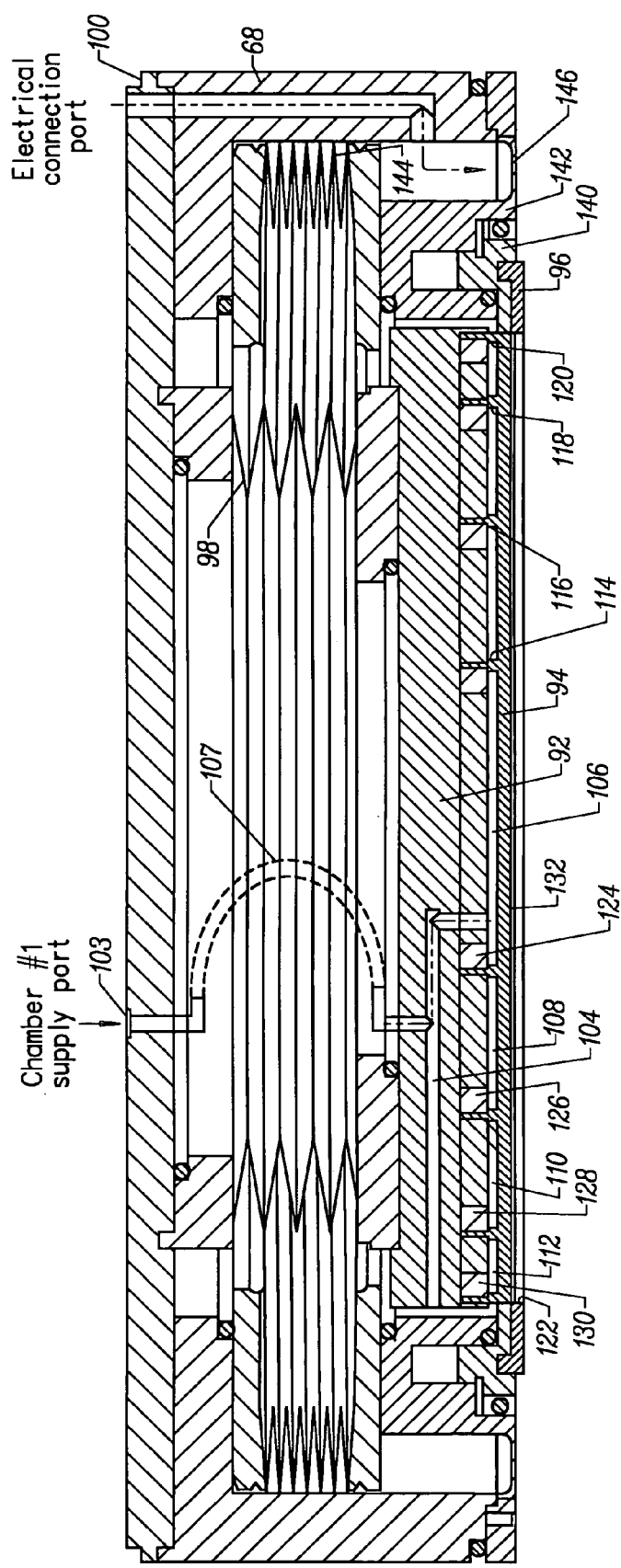
Figure 9A:
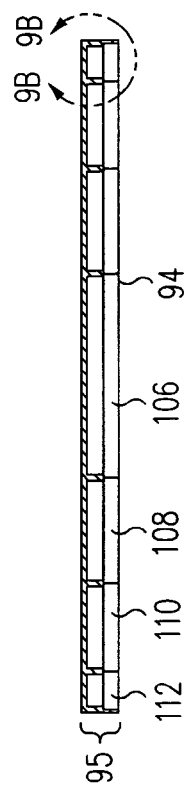
FIGS. 9A and 9B are section views of the flexible membrane in FIG. 8 taken along lines A—A and B—B, respectively.
Figure 9B:
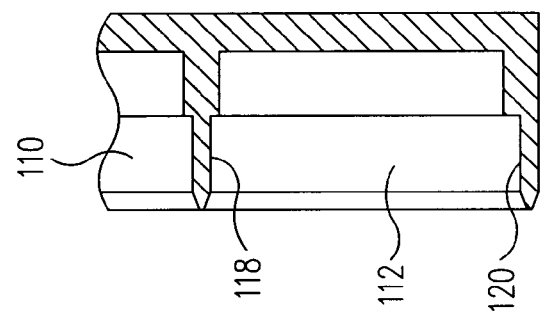

Both the wafer carrier body 68 and the wafer carrier top plate 100 include multiple passageways therethrough corresponding to the electric and fluid passageways 78, 80 of the conduit 76. In the preferred embodiment, six fluid system passageways are formed in the top plate 100, two to provide fluid to pressurize the bladder and retaining ring bellows, respectively, and four to pressurize selective regions of the flexible membrane as discussed below. The fluid passageways of the wafer carrier body 68 are fluidly connected to respective fluid passageways in the wafer carrier base 92 by suitable pressure lines (not shown) which extend within the bladder bellows 98. An example of one fluid system passageway is shown in FIG. 6A where fluid passageway 101 extends through the top plate 100 and fluid passageway 102 extends through the carrier head base 92, the two being coupled via flexible pressure line 105. FIG. 6C shows another fluid system with passageways 103 and 104 extending through the top plate 100 and carrier head base 92, coupled by flexible pressure line 107. Multiple other similar fluid systems may be employed although not shown in the particular sectional views.

Of particular advantage, the carrier head base 92 is connected to the wafer carrier head body 68 by the bladder bellows 98. The bladder bellows 98 permits the carrier base 92 to pivot with respect to the wafer carrier head body 68 so that the wafer carrier base 92 can remain substantially parallel to the surface of the polishing pad 34. Specifically, the bladder bellows 98 permits the wafer carrier base 92 and a wafer mounted therein to rotate relative to the polishing pad 34 and pivot to accommodate both misalignment with the polishing pad 34 and irregularities in the wafer such as taper. The bladder bellows 98 also transfers the downward pressure from the head shaft 64 to the carrier head base 92 independently of lateral loads. Thus, the bladder bellows 98 is isolated form any side load, such as the shear force created by the friction between the wafer and the polishing pad 34, from the wafer. Accordingly, the pressure exerted by the flexible membrane 94 on the wafer against the polishing pad 34 is independent of any side load created during the polishing process. Further, the frictional loads are isolated from the distribution of pressure to the wafer.

An inner surface 122 of the retaining ring 96 defines, in conjunction with the bottom surface of the flexible membrane 94, a wafer receiving recess. The retaining ring 96 prevents the wafer from escaping the wafer receiving recess and transfers the lateral load from the wafer to the wafer carrier head body 68, as is discussed in detail below.

The flexible membrane 94 is connected to and extends beneath the carrier base 92. The bottom surface of the flexible membrane 94 provides a wafer receiving surface. When sealed to the base 92, the flexible membrane 94 forms a closed bladder having a first central chamber 106 and second, third and fourth annular chambers 108, 110, 112. While four chambers are shown and described, other numbers of multiple chambers may be employed, and the present invention is not limited to four chambers. The flexible membrane 94 is a generally circular sheet formed of a flexible and elastic material, such as a high strength silicone rubber. Preferably, the membrane 94 is a material of Shore-A durometer hardness from 40 to 80. The membrane material should have good bonding characteristics with stainless steel or other backing plate material and exhibit chemical resistance to acids and bases.

Of particular advantage, the retaining ring 96 and retaining ring bellows 144 are provided. This aspect of the present invention allows side loads which develop during polishing to be transferred to the wafer carrier body 68, or preferably to the shaft 64 (which is rigidly fixed through top plate 100) by the retaining ring 96, instead of to the wafer. This provides a significant advantage over prior art wafer carriers.

The retaining ring 96 is mounted on an annular retaining ring mounting member 140 which is received in an annular groove of a retaining ring bearing 142. The retaining ring 96 may be retained by screw threads, or any other suitable means for constraining the ring 96 in all directions. In the exemplary embodiment, the retaining ring bearing is comprised of a flexure member 142. Alternatively, the retaining ring bearing may be comprised of a hydrostatic bearing (not shown). The flexure member 142 is interconnected with the wafer carrier head body 68 by the retaining ring bellows 144. The retaining ring bellows 144 is pressurized to bias the retaining ring 96 against the polishing pad. The retaining ring bellows 144 may be formed of any suitable material which provides compliance in the z-direction and has a pressure capacity in the range of about 0–40 psia. The retaining ring bellows may be made of plastic or metal, however plastic is preferred since the retaining ring bellows does not couple torque to the retaining rings unlike the bladder bellows.

As noted above, the inner surface of the retaining ring 96 defines, in conjunction with the bottom surface of the flexible membrane 94, a wafer receiving recess for receiving the wafer 97. The retaining ring 96 prevents the wafer from escaping the wafer receiving recess and transfers the lateral load from the wafer to the wafer carrier head body 68.

The flexure member 142 is additionally interconnected with the wafer carrier head body 68 by a thin annular portion 146. In an alternative embodiment, the flexure member 142 may be replaced with a bearing to allow relative motion. The thin annular portion 146 allows vertical motion of the retaining ring 96 without influencing the load on the retaining ring. Of significant advantage, this allows the transfer of side loads on the retaining ring 96 to the wafer carrier body 68 independently of the pressure of the retaining ring 96 against the polishing pad 34 and independently of the pressure of the wafer against the polishing pad. By allowing the independent and precise control of the pressure exerted by the retaining ring on the polishing pad, the present invention allows the control of edge effects, such as edge fast polishing. The load contribution by the flexure member 142 may be measured by strain gauges 151 placed on the thin annular portion 146, and minimized by vertical movement of the wafer carrier by the actuator.

Figure 8:
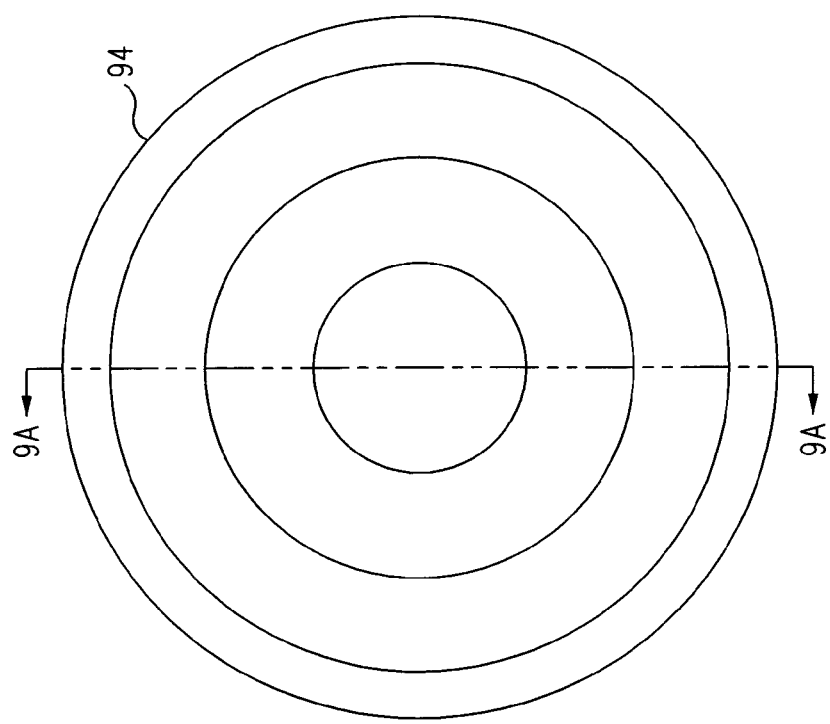
FIG. 8 is a top view of the flexible membrane in accordance with one embodiment of the present invention.
Figure 10B:
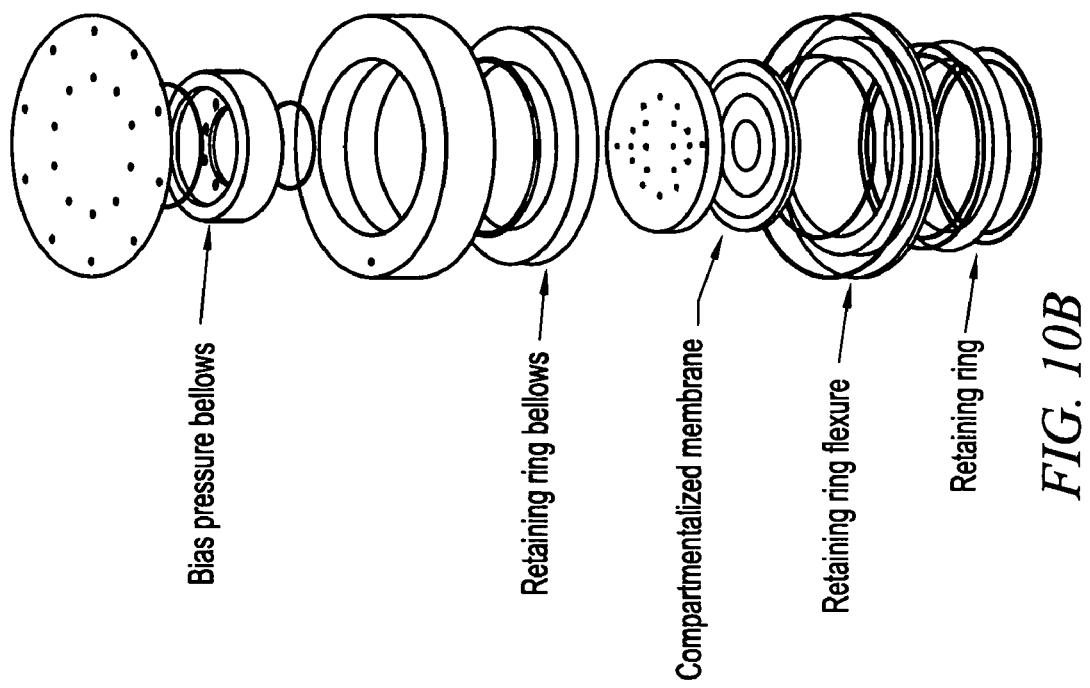
FIGS. 10A and 10b are an exploded perspective views of a wafer carrier head shown in FIGS. 6A–6C.
Figure 10A:
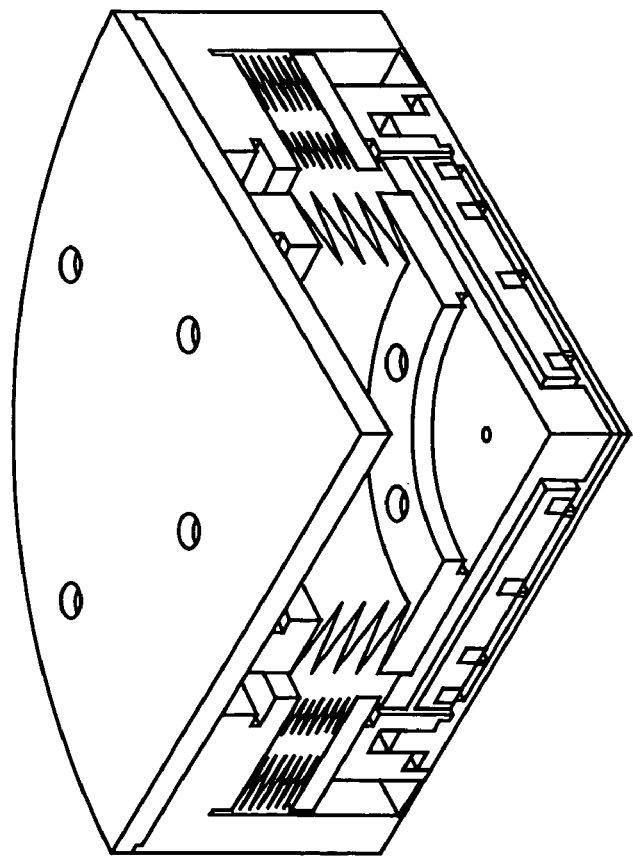

As described above, and shown in further detail in FIGS. 8, 9A and 9B, the flexible membrane 94 is connected to a backing plate or the carrier base 92 to form a closed bladder which includes a plurality chambers 106, 108, 110, 112. For example, the flexible membrane shown in FIG. 3 includes four vertically extending concentric flanges 114, 116, 118, 120 which, when connected to the carrier base 92, define a first central circular chamber 106, a second annular inner chamber 108 surrounding the first chamber 106, a third annular middle chamber 110 surrounding the second chamber 108, and a fourth annular outer chamber 112 surrounding the third chamber 110. Pressurization of the chambers controls the downward pressure of the wafer against the polishing pad 34.

The membrane may be constructed of any suitable material, such as a flexible elastomer. Preferably, the membrane is a silicone rubber material having a Shore-A durometer hardness in the range of about 40 to 80. The membrane material should have good bonding characteristics with stainless steel, and should exhibit chemical resistance to acids and bases.

A first annular flange may 114 be secured in a first annular depression or groove on a bottom surface of the carrier base and locked in place with a first insert ring 124 which is releasably received within the first annular depression. Similarly, second, third and fourth insert rings 126, 128, 130 lock the second, third and fourth annular flanges into second, third and fourth annular depressions or grooves, respectively.

A pump or other suitable regulated fluid pressure source (not shown) is operably connected to the first chamber 106 by a suitable first fluid circuit which extends through the rotary fluid coupling, the conduit, the head shaft flange 86, the wafer carrier head body 68, through a suitable fluid line extending through the bladder bellows 98 and through the wafer carrier head base 92. Similarly, second, third and fourth pumps or other regulated fluid pressure sources are operably connected to the second, third, and fourth chambers.

As a pump forces a fluid, preferably a gas such as air, into one of the chambers, then the pressure in that chamber will increase and the front of the flexible membrane will be forced downwardly or outwardly against the wafer. This in turn urges the wafer against the polishing pad. As each of the chambers may be independently pressurized, this allows for selected localized regions of the wafer to be polished at a faster rate than other regions.

More specifically, in the preferred embodiment the flexible membrane 94 includes a first circular inner portion 132, a second annular inner portion 134, a third annular middle portion 136, and a fourth annular outer portion 138 located beneath the first, second, third and fourth chambers, respectively. As such, the pressures in the chambers can control the downward pressure applied by the respective flexible membrane portions to a corresponding portion of a wafer against the polishing pad. While four chambers are described, any number of two or more chambers may be used, and the invention is not limited to the one example shown.

Generally, the outermost annular membrane portions 136, 138 are more narrow in the radial direction in comparison to the first and second membrane portions 132, 134 in order to provide accurate pressure control of narrow edge regions adjacent the edge of the wafer independently of the pressures applied to the center and middle portions of the wafer. In one example the first 132, second 134, third 136 and fourth 138 membrane portions have a radial width of about 30 mm, 30 mm, 25 mm and 15 mm, respectively.

The pressures in the chambers may be independently controlled to maximize the uniformity of polishing of the wafer. The average pressure in any of the chambers may be controlled independently of the other chambers during polishing so as to compensate for uneven polishing.

The flexible membrane 94 deforms to match the backside of the wafer. For example, if the wafer is warped or bowed, the flexible membrane, will in effect, conform to the contours of the warped or bowed wafer. Further, the flexible membrane will confirm to thickness variations on the surface of the wafer. Thus, of particular advantage the load on the wafer should remain substantially uniform even if there are surface irregularities on the back side of the wafer.

In operation, a wafer is loaded onto the wafer in the wafer receiving recess with the backside of the wafer abutting the flexible membrane. The wafer can be held by vacuum-chuck force from the underside of the flexible membrane 94. For example, a vacuum can be drawn in any one of the, and preferably in two, of the chambers of the flexible membrane to hold the wafer.

The surface of the wafer and the polishing pad are urged against each other. A slurry is fed to the interface between the wafer and pad. The wafer and the polishing pad are both typically rotated, however this is not a requirement. One or both of the wafer and pad may be moved linearly. As the pad and wafer are urged against each other, material on the surface of the wafer is removed. One example of a CMP process that may be practiced with the apparatus of the present invention is further described in co-pending U.S. patent application Ser. No. 09/629,962 which is incorporated by reference in its entirety.

Figure 7:
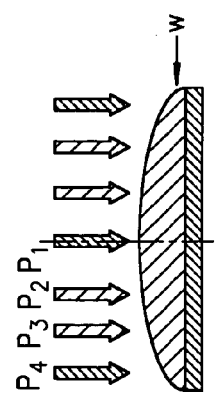
FIG. 7 is a schematic view of pressures generated by the wafer carrier head of FIGS. 6A–6C against a wafer during a chemical mechanical polishing procedure in accordance with the present invention.

Of significant advantage the present invention provides for independently varying the pressure within the chambers in the flexible membrane via the separate fluid passageway systems to urge the corresponding portions 132, 134, 136 and 138 against the wafer at corresponding localized regions or zones on the wafer surface. This allows the apparatus of the present invention to control and vary the amount of material removal at each of the localized zones on the wafer surface. In particular, a plurality of zones are defined on the surface of the wafer and correspond to chambers formed in a membrane that engage the wafer. Preferably, the zones are annular; however, the zones may be formed of any suitable shape. Referring to FIG. 7, one example of these zones are schematically illustrated, and are further described in co-pending application Ser. No. 09/628,874. By varying the pressure in the chambers, the rate of polishing on the wafer is controlled at the localized zones on the wafer corresponding to each of the adjacent chambers and portions.

Specifically, the pressure applied to the wafer is separately controlled by the pressure in each of the chambers as indicated the arrows $P_1$–$P_4$ in FIG. 7. The result is that concentric zones or regions on the wafer surface can be polished at different rates by controlling the pressure in the corresponding chambers 46. Although four zones are shown in the figures, any suitable number of two or more zones may be defined. Further, the zones may be of a different shape and are not limited to an annular shape, although an annular shape is preferred for the outer zones. In the preferred embodiment, the membrane contains four chambers defining four zones, the four zones being comprised of one circular center zone and three annular concentric zones.

Preferably, the CMP apparatus of the present invention will include one or more in-situ sensors that provide information regarding the progression of polishing of the wafer. The key parameter during polishing is the removal rate of material from the surface of the wafer. Thus, preferably, a sensor will provide information about the removal rate with a spatial resolution of about 2 to 5 times finer than the width of the zones formed by the chambers in the flexible membrane. This includes the effective spot size of the sensor as well as the effective sample spacing. Sample spacing is a function of the relative velocity between the sensor and wafer, and the sample rate used. The most appropriate type of sensor may vary depending on the type of material being removed. For example, when removing an oxide layer, interferometric sensors as known in the art may be employed. Alternatively, when removing a metal layer, a reflectance sensor may preferred to measure the presence or absence of the metal layer on the surface of the wafer. Further, the absence of the metal may be used to signal the endpoint. One example of a sensor that may be employed with the apparatus of the present invention is described fully in co-pending U.S. patent application Ser. No. 09/628,874 which is incorporated by reference in its entirety.

Moreover, by using information about the initial coating thickness on the wafer, and the polishing time, endpoint information may be used to calculate an estimate of the removal rate, and this information may be used to predict the polishing characteristics of subsequent wafers. Thus, the information provides a means for controlling the CMP process parameters such as pressure velocity, and the like when polishing subsequent wafers, and is referred to as "run-to-run" control. Also, the instantaneous endpoint signal indicated by a reflectance sensor may be used to reduce the removal rate in each of the localized regions on the wafer for real time control.

Several methods may be used to provide process control for the compartmentalized membrane and feedback techniques. For example, for oxide removal or polishing, thickness information may be used to measure the removal rate, and the pressure is controlled accordingly to influence the removal rate independently in any one of the zones. The primary description of the removal rate is an adaption of Preston's equation, which states that the material removal rate (MRR) is given by the equation MRR=kpPV, where kp is a constant influenced by all processing parameters, P is the applied pressure, and V is the relative velocity. Accordingly, the pressure may be varied to linearly affect the removal rate. A further description of these process conditions can be found in the co-pending U.S. patent application Ser. No. 09/629,962.

During metal polishing, the information available may one represent the local endpoint for a particular zone or region. Using this information, further overpolishing of the wafer surface may be reduced in the zone by reducing the pressure applied to the corresponding compartment. Additionally, this information may be used on the subsequent wafer to adjust the pressure distribution such that local endpoint for each of the pressure zones is reached at close to the same time.

Figure 11:
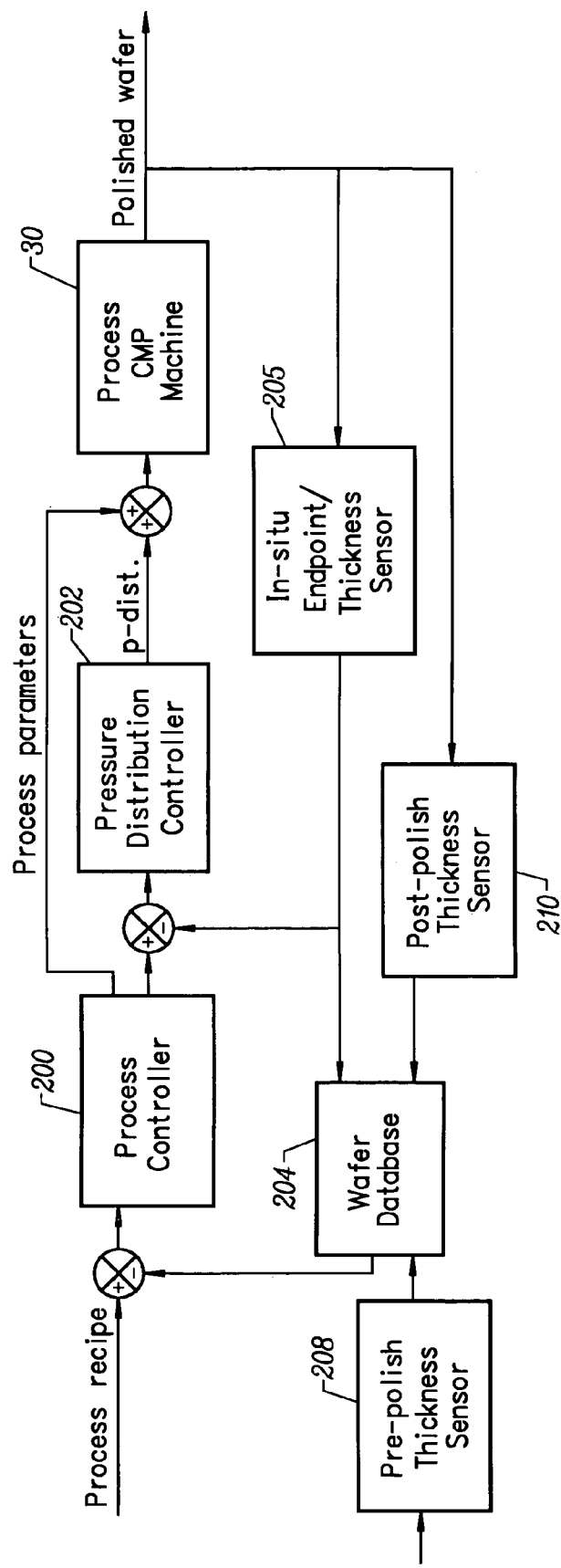
FIG. 11 is a schematic block diagram of a control system in accordance with one embodiment of the present invention.

One example of a control schematic is shown in FIG. 11. FIG. 11 shows a block diagram of one example of a control system that may be used with the present invention. The control system is comprised primarily of a process controller 200, pressure distribution controller 202, sensor 205, and a wafer database 204. The process controller 200 receives data establishing the process parameters or recipe, and sends commands to the CMP machine 206 to control the CMP process. Additionally, coupled to the process controller 200 and the CMP machine 206 is the pressure distribution controller 200 which controls the pressure within the chambers of the flexible membrane.

The pressure distribution controller 202 receives data via two routes. First, the pressure distribution controller 202 may receive data representative of the reflectance measurements in each of the zones on the wafer directly from the sensor 205. The pressure distribution controller 202 includes hardware and software configured to receive the reflectance measurements, determine the appropriate pressure adjustment needed (if any) within each zone, and then sends a signal to the CMP machine to selectively adjust the pressure within the subject zone as appropriate. The reflectance data from the sensor is also transmitted to, and stored in, the wafer database 204.

In an alternative embodiment, pre-determined pressure profile values and/or threshold values for each of the zones are stored in the wafer database 204. These values are then transmitted to the process controller 200 or the pressure distribution controller 202. The pressure distribution controller compares these values to the actual, real-time reflectance values from the sensor 205 and sends a signal to the CMP machine 206 to adjust the pressure in each of the zones as appropriate. Additional data, such as the pre-polish thickness of the wafer 208 and/or the post-polish thickness of the wafer 210 may be sent to the wafer database to assist in determining the appropriate pressure adjustment.

In another embodiment of the present invention, model based detection may be used to monitor and control the CMP process. Specifically, model based control provides for the real time adjustment of the CMP process parameters to better tailor the CMP process to the most effective and efficient process. The detection systems described above focus primarily on selectively controlling the pressure in the zones to provide for substantially uniform polishing of the localized regions of the wafer. This minimizes the occurrence of over-polishing in some regions and under-polishing in other regions. The model based detection system, in addition to providing substantially uniform polishing of the wafer, also provides real time control of certain of the other CMP process parameters to improve the overall CMP process.

Thus, information from the wafers before polishing can be very useful for process control. This is termed "feed-forward" control. Also useful is information on previously polished wafers. This is termed "run-to-run" control. In-situ measurement of the state of the wafer surface during polishing provides "real-time" control.

An improved apparatus and method for chemical mechanical polishing of semiconductor wafers has been provided. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. For example, the apparatus of the present invention may also be employed in backside grind applications. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A wafer carrier assembly for use in a chemical mechanical polishing system, comprising:
    a wafer carrier support frame;
    a wafer carrier head housing rotatably mounted on said wafer carrier support frame;
    a wafer carrier base;
    a compartmentalized flexible membrane connected to the wafer carrier base and defining a plurality of concentric chambers;
    a retaining ring, operatively connected to a retaining ring bearing which allows relative axial motion while constraining relative radial motion between said retaining ring and said wafer carrier head housing;
    a retaining ring bellows operatively connected to said retaining ring bearing to urge said retaining ring against a polishing member; and
    a bladder bellows operably connecting said wafer carrier base to said wafer carrier head housing such that rotational torque is transferred from said wafer carrier head housing to said wafer carrier base,
    wherein a chamber formed by said bladder bellows, said wafer carrier base, and said wafer carrier head housing may be pressurized to load said wafer carrier base and compartmentalized flexible membrane against the polishing member, independent of any frictional loads on said retaining ring
    and wherein the compartmentalized flexible membrane has a lower surface providing a wafer receiving surface with a plurality of inner portions associated with respective ones of said plurality of concentric chambers such that pressures within each of said chambers are independently controllable.

2. The wafer carrier assembly of claim 1 wherein said retaining ring bearing is a flexure member.

3. The wafer carrier assembly of claim 1 wherein said retaining ring bearing is a hydrostatic bearing.

4. The wafer carrier assembly of claim 1 wherein said retaining ring bellows is pressurized to a pressure in the range of about 0 to 40 psia.

5. The wafer carrier assembly of claim 1, further comprising:
    a mounting flange connected to said wafer carrier support frame, said mounting flange having a substantially vertical through—bore;
    a cylindrical head shaft rotatably connected to said mounting flange and concentrically disposed in said through—bore; and
    an electric motor having a stator mounted on said mounting flange and a rotor mounted on said cylindrical head shaft.

6. The wafer carrier assembly of claim 1 wherein the flexible membrane includes first, second, third and fourth flanges, each flange being secured to a lower surface of the wafer carrier base to define first, second, third, and fourth chambers, respectively.

7. The wafer carrier assembly of claim 6 wherein said first chamber is circular and has a radial width of about 30 mm, said second chamber is annular and has a radial width of about 30 mm, said third chamber is annular and has a radial width of about 25 mm, and said fourth chamber is annular and has a radial width of about 15 mm.

8. The wafer carrier of claim 1 wherein said bladder bellows is pressurized to a pressure in the range of about 0 to 40 psia.

9. The wafer carrier assembly of claim 5 further comprising:
    a tubular conduit extending concentrically within said head shaft, said tubular conduit including a plurality of passageways for coupling fluid lines to independently pressurize said bellows and said plurality of chambers.

* * * * *